Inventors:
Francois Maurice Spire Fouré
and
David John Smithson
By Baldwin Wight Diller & Brown
Attorneys Inventors:
Francois Maurice Spire Fouré
and
David John Smithson
BY Baldwin Wight Diller & Brown
Attorneys Inventors:
Francois Maurice Spire Foure
and
David John Smithson
BY Baldwin Wight Diller & Brown
Attorneys Inventors:
Francois Maurice Spire Foure
and
David John Smithson
BY Baldwin Wight Diller & Brown
Attorneys Inventors:
Francois Maurice Spire Foure
and
David John Smithson
BY Baldwin Wight Diller & Brown
Attorneys Inventors:
Francois Maurice Spire Foure
and
David John Smithson
BY Baldwin Wight Diller & Brown
Attorneys Inventors:
Francois Maurice Spire Foure
and
David John Smithson
BY Baldwin Wight Diller & Brown
Attorneys

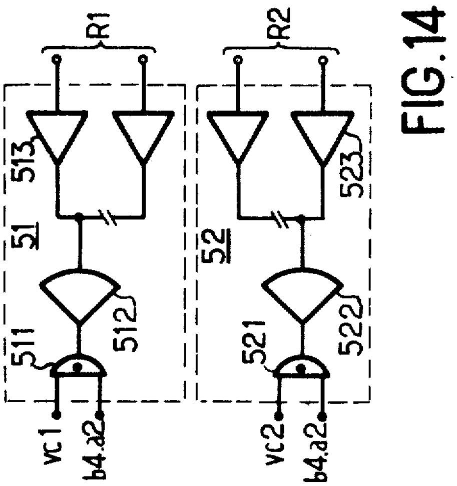
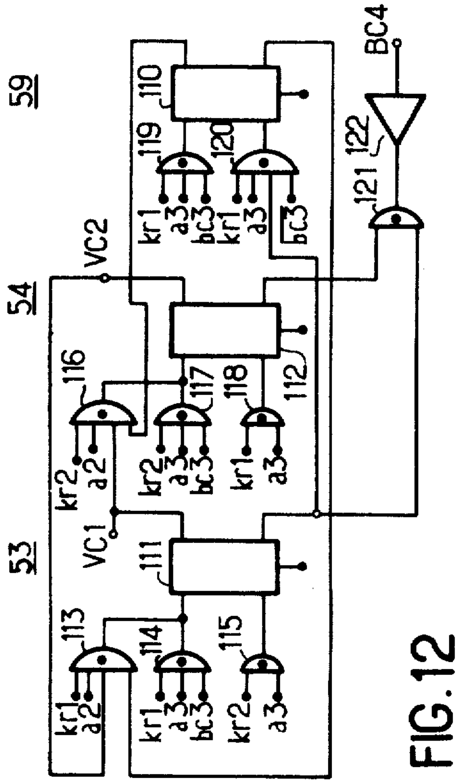
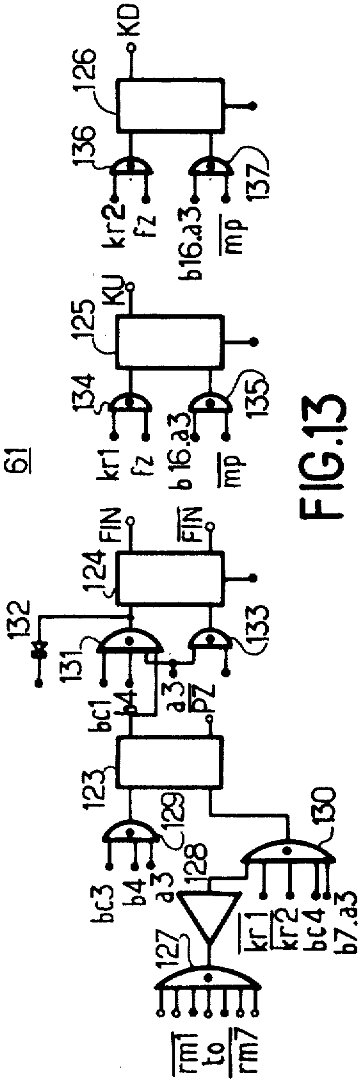
Inventors:
Francois Maurice Spire Foure
and
David John Smithson
BY Baldwin Wight Diller & Brown
Attorneys Inventors:
Francois Maurice Spire Foure
and
David John Smithson
BY Baldwin Wight Diller & Brown
Attorneys United States Patent Office 3,430,210
Patented Feb. 25, 1969

3,430,210

ARRANGEMENT FOR THE CONTROL OF THE RECORDING OF ALPHANUMERICAL CHARACTERS

Francois Maurice Spire Fouré, Paris, and David John Smithson, Marly-le-Roi, France, assignors to Societe Industrielle Bull-General Electric (Societe Anonyme), Paris, France, Filed Feb. 27, 1967, Ser. No. 618,854
Claims priority, application France, Mar. 8, 1966, 52,547
U.S. Cl. 340—172.5 15 Claims
Int. Cl. G11b *13/00*

ABSTRACT OF THE DISCLOSURE

In a printer of the type-drum class, the provision of a print control arrangement which proceeds by comparison of print codes for characters and spaces with type-codes changing at each line of type faces. This asynchronous arrangement comprises a recirculating memory which dynamically stores two index-codes interspersed with 2N character codes. Index-code detector means permit commencement of the introduction of comparison results in either of two shift registers according to which index-code is detected first after a drum position pulse, so that the circulation time of said memory may be relatively large.

Figure 1:
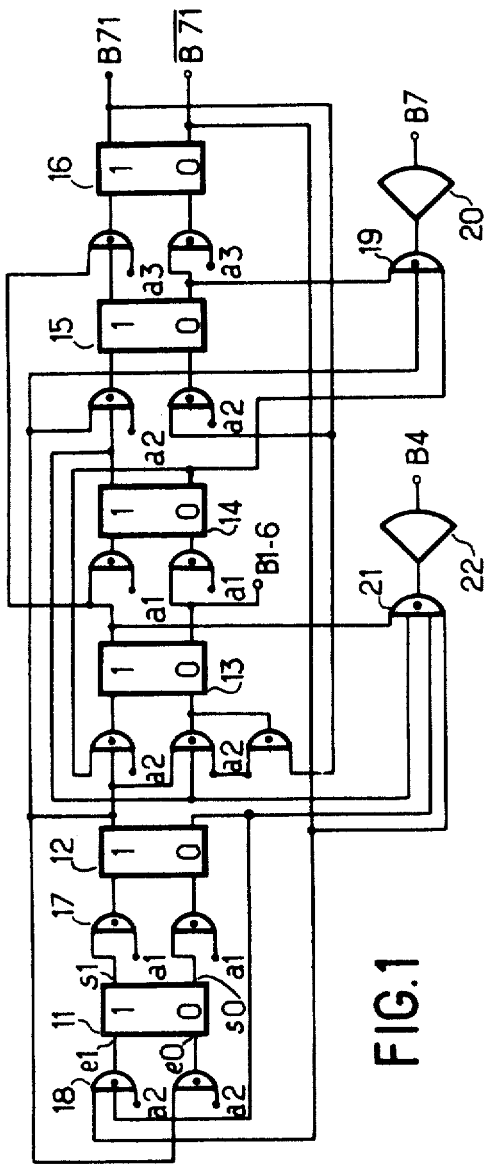

The present invention relates to character-recording systems operating generally under the control of a data processor which is capable of sequentially supplying coded representations of characters to constitute a line of characters to be recorded.

Although this recording may take place by punching, the application of the invention is particularly envisaged in the present case in a printing machine designed to print a line of characters in successive printing phase, in the course of each of which a number of characters of one type may be simultaneously printed.

High-speed printing machines generally comprise a series of aligned striking members co-operating with a continuously rotating type-drum. Printing control arrangements are known which comprise, as device for storing a line of characters, a memory of the series (per character)-parallel type (for the binary positions of the character codes), as also a comparing device which can compare, in the course of each printing phase, the representations of characters stored with the code of the type of character allocated to this printing phase, for the purpose of controlling the actuation of the striking members of the appropriate recording positions.

The use of a series-parallel memory constitutes a disadvantage in that it generally involves relatively costly equipment. From this viewpoint, it would be very advantageous to employ as storage device a memory of the purely "series" type, also called a "recirculation memory," in which the character codes circulate along a single path. Unfortunately, when the number of characters of a printing line is large, a difficulty arises owing to the lengthening of the circulation cycle appropriate to this mode of storage, in relation to the duration of each of the printing phases. Now, this duration is limited because it results, on the one hand, from the number of character types present on the periphery of the drum and on the other hand from the speed of rotation of the drum.

Moreover, if it is desired to employ a "series" memory having a reduced circulation time, all the accessory or associated circuits become relatively costly by virtue of the fact that they must operate at higher pulse frequencies.

A first object of the invention is to satisfy conflicting requirements, notably by reconciling the use, as storage device, of a recirculation memory with the very satisfactory output of a printing machine which must, for example, be capable of printing at least one thousand lines of characters per minute.

A second object of the invention is to provide a recording control arrangement which is endowed with operating flexibility such that an operation of printing a line of characters may be initiated regardless of the angular position of the type-drum.

Another object of the invention is to provide a printing control arrangement which is provided with means by which the end of an operation of printing a line of characters may be detected for purposes of signalling regardless of the angular position of the type-drum.

An essential and advantageous feature of the invention resides in the fact that two reference characters are stored in the "series" memory, dividing the characters of a printing line into two parts of N character representations. Owing to these two reference characters, it is possible to choose for the "series" memory a circulation time equal to, or even larger than, one-half of the duration of each printing phase.

Means and methods for filling a recirculation memory from a data processor may be found in a patent application filed in the United States on Feb. 27, 1967 by the same applicants (Ser. No. 618,855).

Accordingly, there is provided in accordance with the invention a recording control arrangement which co-operates with a recording system which operates in successive recording phases, in the course of each of which a number of characters of like type may be simultaneously printed after comparison with a character type-code, a line of printed characters comprising 2N recording positions, which arrangement comprises: a recirculation memory adapted for the cyclic recirculation of at least $2N+2$ character representations including an access element at the terminals of which each of the characters is successively accessible, each part of N characters being preceded by a different index-code; a comparator adapted to compare, from the said access element, each character in circulation with a code representative of the type of character stored in a register; two detecting devices each arranged to detect one of the said index-codes from the said access element; two memory registers controlled by the detecting devices, including a first register and a second register for memorising the detection of a first index-code and of a second index-code respectively; control means by which these two registers may be separately set in operation in any order of succession; two shift registers each composed of at least N stages, the output of each stage being connected to a character printing control member, and switching means under the control of the two memory registers which are so arranged that, after the occurrence of a control signal which is not synchronous with the circulation cycle of the recirculation memory, they permit the commencement of the introduction of the comparison results supplied by the comparator, in either of the shift registers, depending upon which of the index-codes is first detected after the reception of the said control signal.

The printing control arrangement according to the invention is further characterised by other switching circuits adapted to produce the erasure, in the recirculation memory, of any character representation which has been found to be identical to the character type-code, in order to effect the progressive emptying of the recirculation memory in the course of the printing operation.

Figure 2:
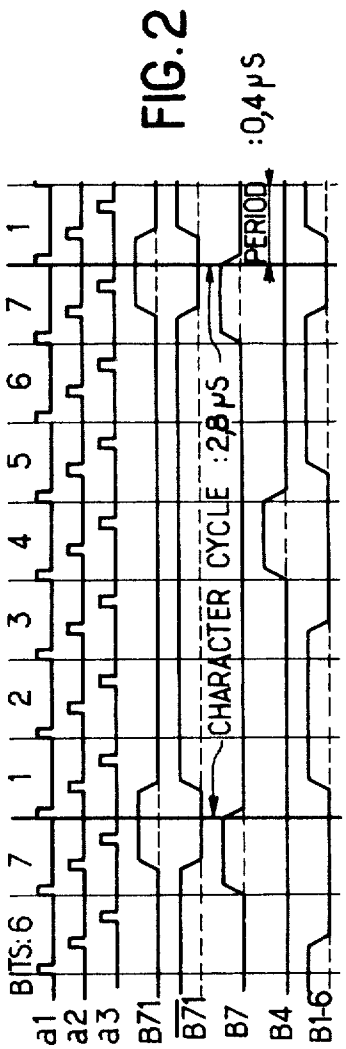
Figure 3A:
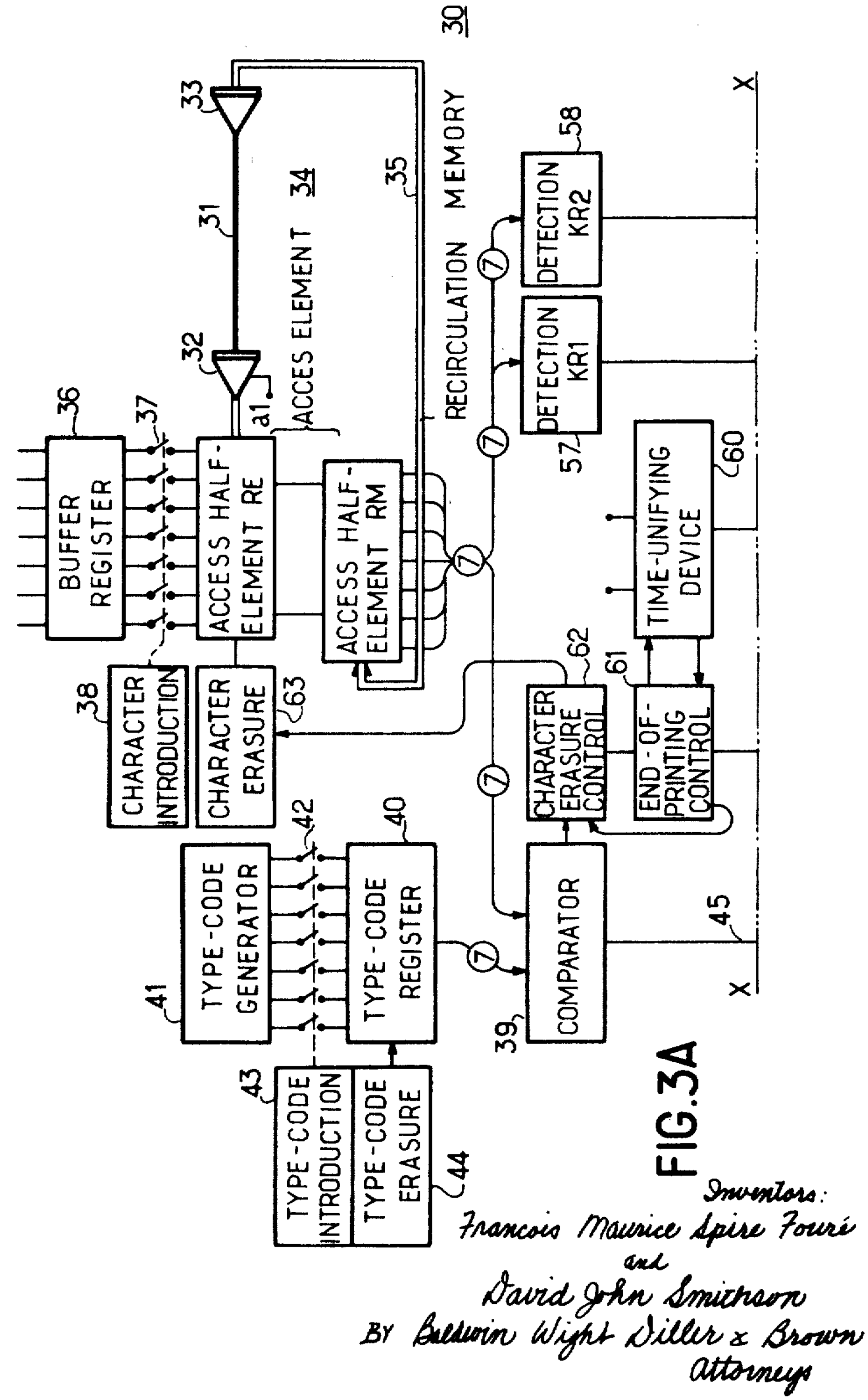
Figure 3B:
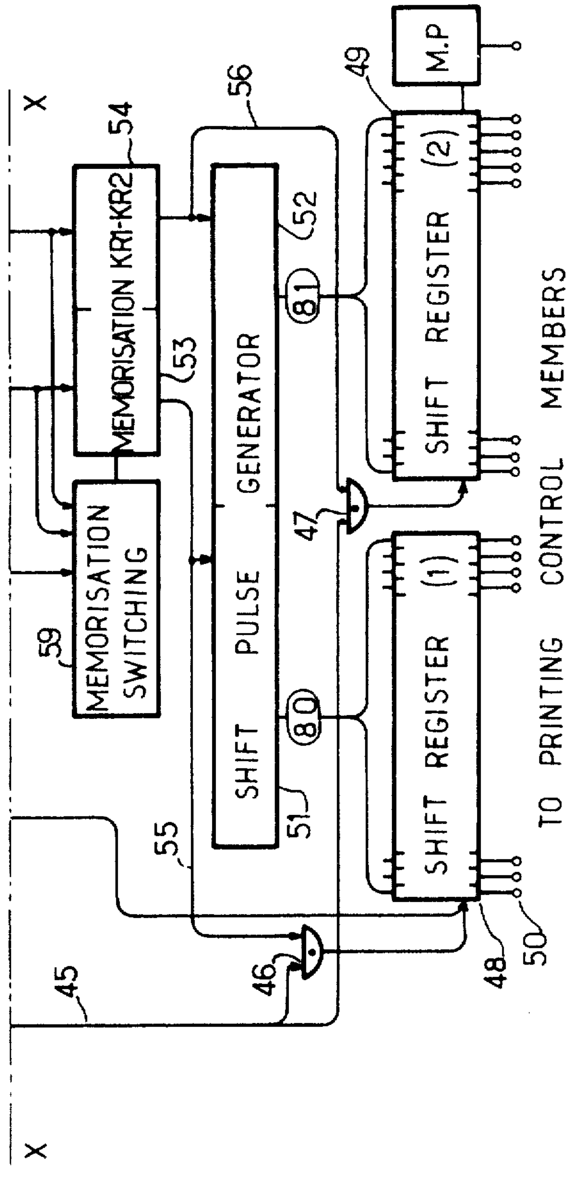
Figure 4:
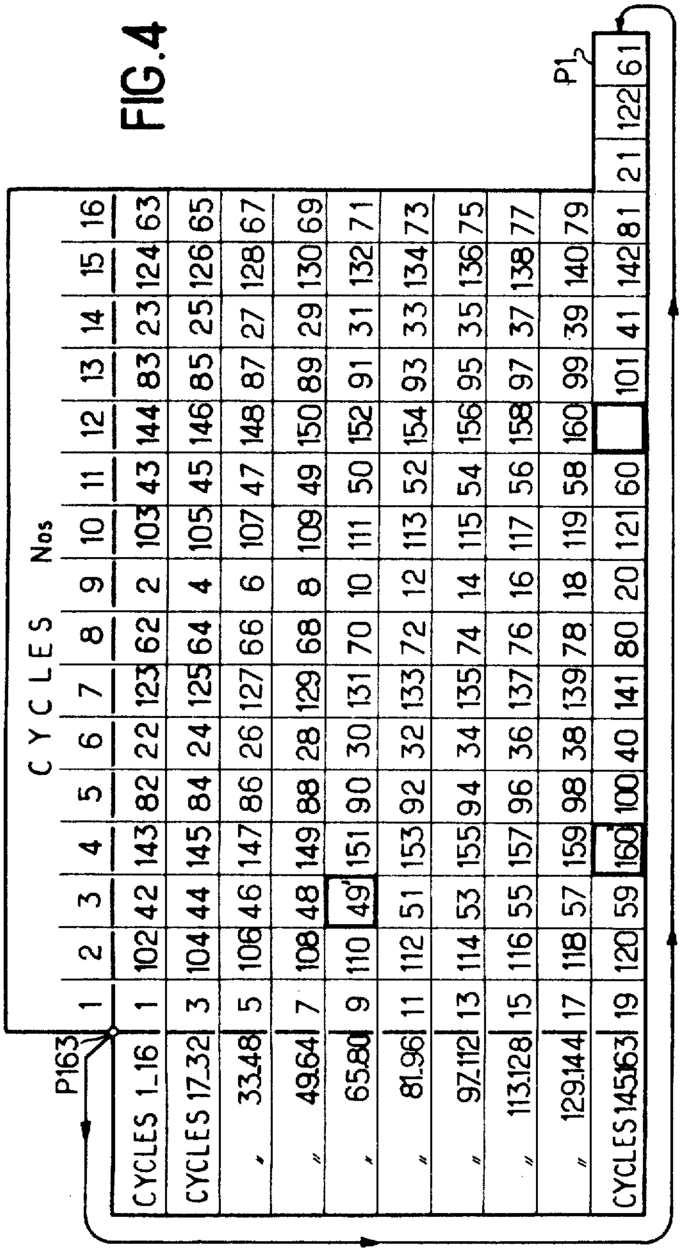
Figure 5:
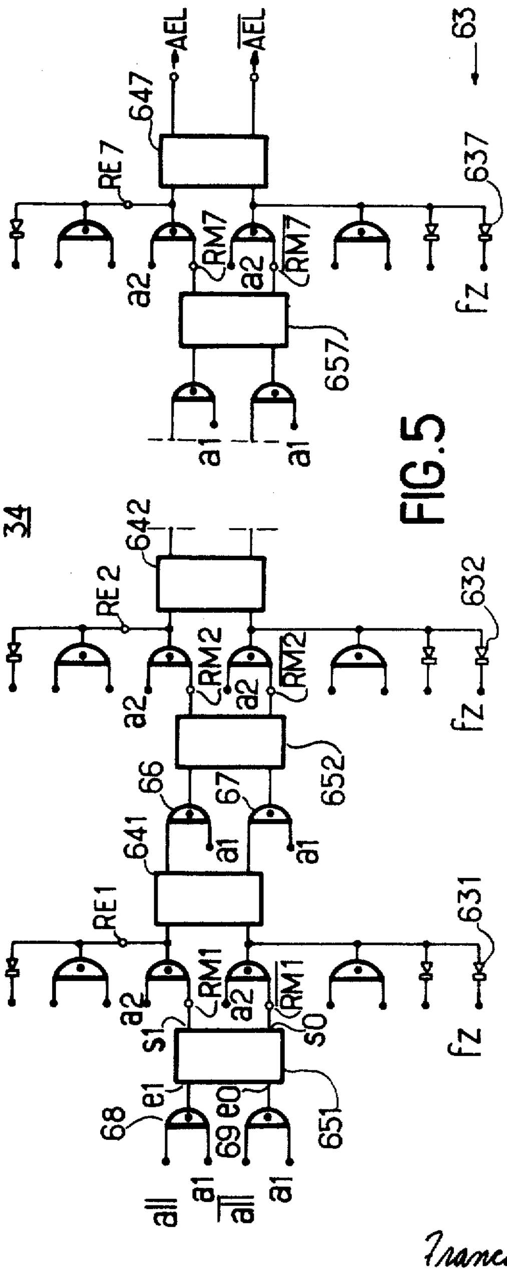
Figure 6:
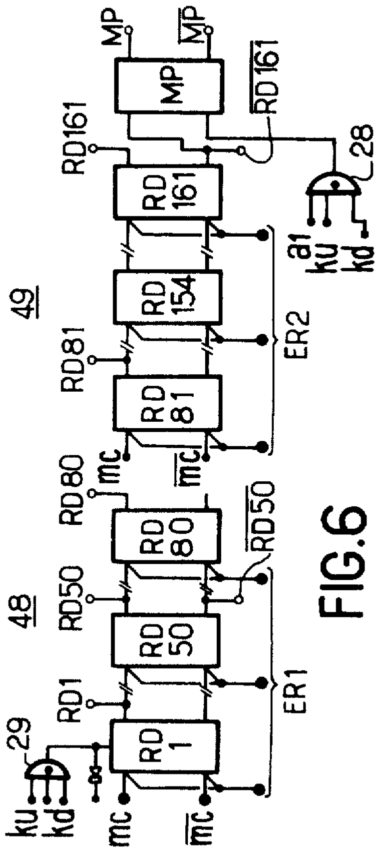
Figure 7:
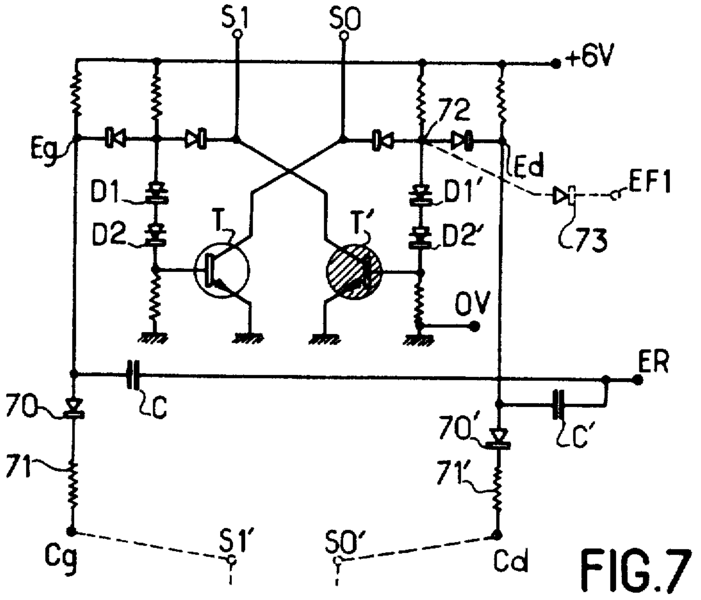
Figure 8:
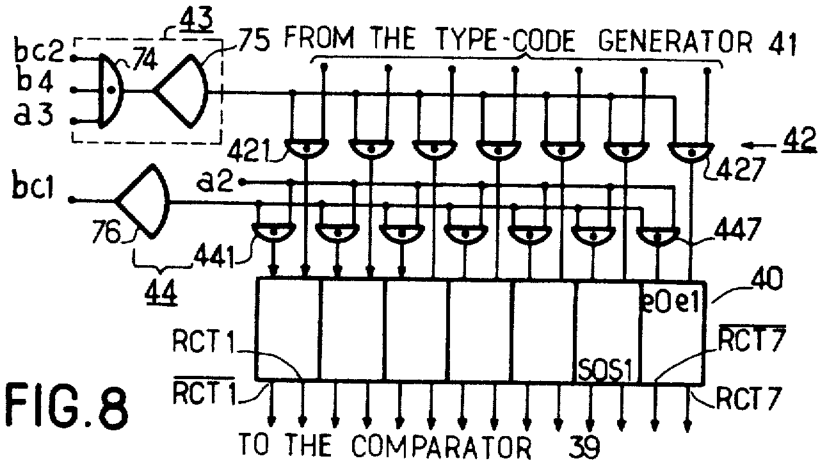
Figure 9:
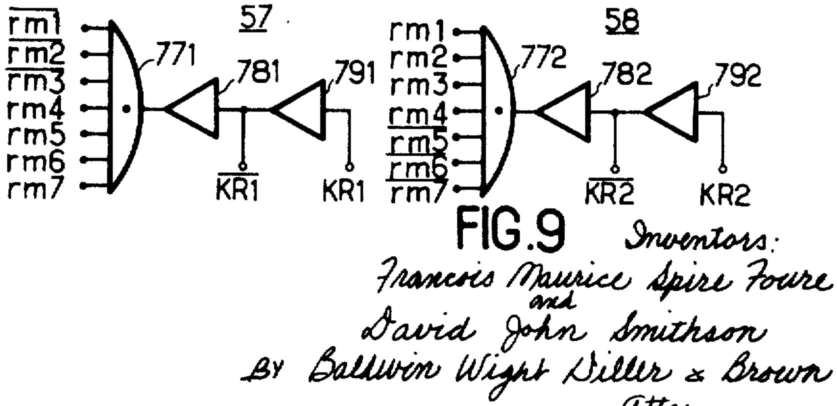
Figure 10:
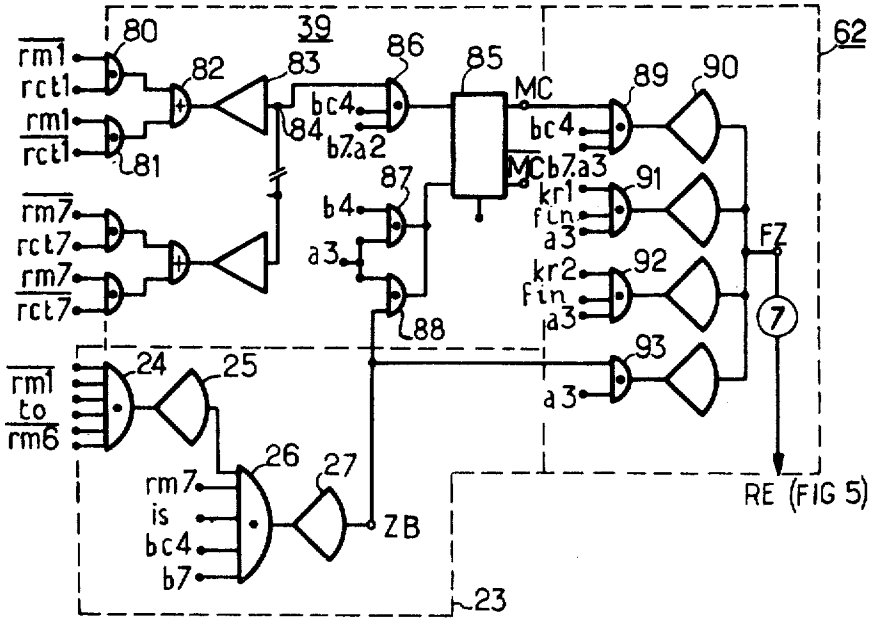
Figure 11:
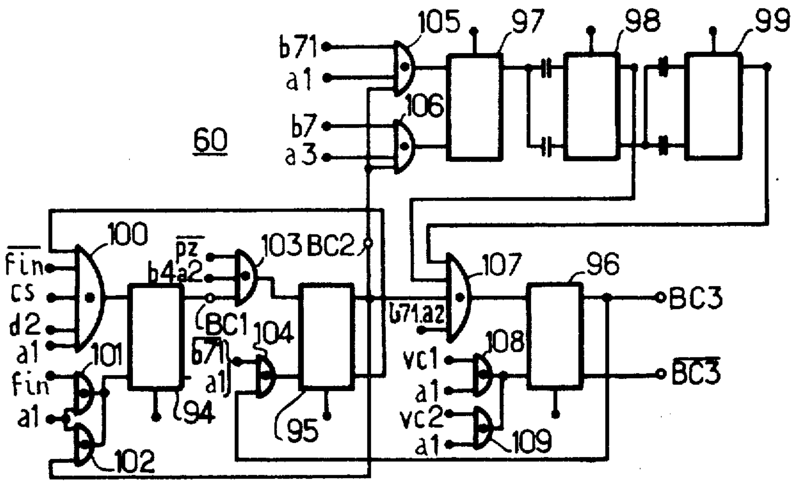
Figure 15:
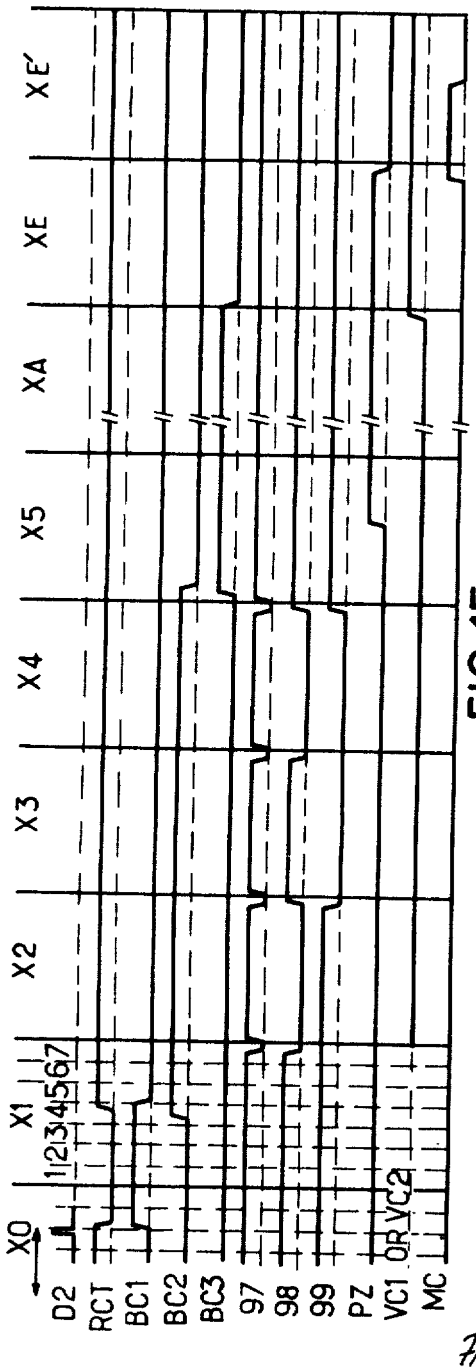
Figure 16:
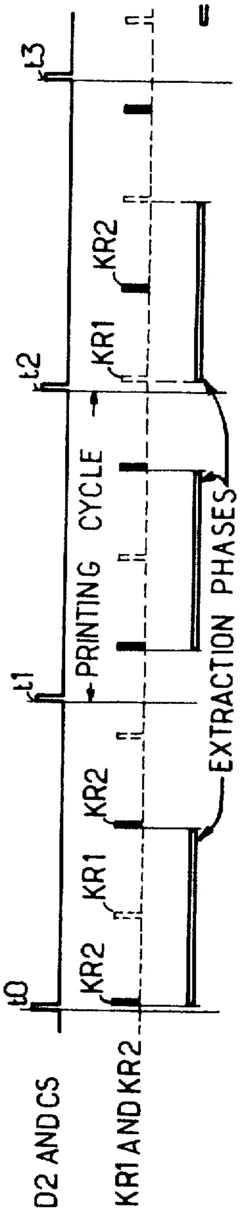

Further features of the invention, and the manner in which it is put into practice, will become more clearly apparent in the course of the following detailed description and with reference to the accompanying drawings in which:

FIGURE 1 is a diagram of a clock-memory pulse generator associated with the printing control arrangement, FIGURE 2 is a time graph relative to the pulse generator, FIGURES 3A and 3B show a basic diagram relative to the printing control arrangement, FIGURE 4 is a table explaining a possible arrangement of the character codes in the recirculation memory, FIGURE 5 is a logical diagram of an access element of this memory, FIGURE 6 shows logical diagrams of the two shift registers, FIGURE 7 is the circuit diagram of a stage of the shift registers, FIGURE 8 is the logical diagram of a type-code register and of its input control circuits, FIGURE 9 shows the logical diagrams of the two index-code detectors, FIGURE 10 shows the logical diagrams of the comparator and of the character erasure control device, FIGURE 11 is the logical diagram of a time-unifying device, FIGURE 12 is the logical diagram of two devices for memorising the detection of the index-codes, FIGURE 13 is the logical diagram of members constituting an end-of-printing control device, FIGURE 14 shows logical diagrams of the shift pulse generators, and FIGURES 15 and 16 are two time graphs explaining the general operation of the printing control arrangement.

The printing control arrangement is included in, or cooperates with, a high-speed printing machine which, as already stated, comprises a series of striking hammers aligned parallel with the continuously rotating type-drum. Since this machine may be of any appropriate type at present known, it is unnecessary to describe its mechanical parts, which do not form part of the invention.

It is necessary to define a number of features which will be useful for appreciating the performances to be obtained from the printing machine in a typical application of the invention.

There are provided to correspond with a printing line comprising 160 printing positions (characters and spaces) 160 striking hammers and the same number of printing control members, each of which may in known manner be an electromagnet actuated by an amplifier, a transistorised generator, etc. The type-drum rotates at a speed of 1000 r.p.m. Its periphery is divided into 64 sectors, each bearing 160 characters of a particular type, except for a single sector comprising no character. A number of pluse-generating devices may supply pulses in relation with the cycle of rotation of the drum, namely one pulse per revolution which defines a reference position of the drum and one pulse per sector which indicates that a series of printing types is about to arrive opposite the series of striking hammers. The interval of time between these two latter pulses corresponds to the duration of a printing cycle. This mean duration is therefore in the present instance 903.8 microseconds. These pulses bear the reference D2 in the course of the description. Further devices may supply another pulse, reference CS, at the beginning of any printing phase, only if the paper is stopped, i.e. if a preceding line-spacing or skipping movement has been completed.

Devices whose function are mentioned in the foregoing are well known. They have already been described in United States patent specifications, such as, for example, patent specifications Nos. 2,915,966 and 2,915,967, published on Dec. 8, 1959.

There are provided 62 character types which may be printed, namely the letters of the alphabet, the digits and punctuation signs or various symbols. The coding of the characters, when they are stored, therefore involves seven binary positions or "bits," i.e. 6 positions for the binary weights 1, 2, 4, 8, 16 and 32 and one position for a parity, or rather imparity, bit. In fact, any printing character code must normally comprise an odd number of "1's." The code for the "space" or blank between characters is composed of a single "1" in the extreme right-hand position.

Before proceeding with the description of the general basic diagram, there will be considered a device for generating rhythm pulses, known as "clock-memory" pulses by reason of the fact that they serve to synchronise the operation of the printing control arrangement in close relation with the circulation cycle of the character storage memory.

Referring to FIGURES 1 and 2, the said generator is composed of six bistable trigger circuits 11 to 16 interconnected by logic circuits. In accordance with a widely accepted convention, such a trigger circuit is represented in FIGURE 1 by a rectangle. It will be assumed that a trigger circuit, which is fairly frequently composed of two transistors, has two input terminals *e*1 and *e*0 and two output terminals *s*1 and *s*0. In one embodiment, when the trigger circuit is in the "0" state, a positive voltage, i.e. +3.5 volts, is available at the output *s*0, while the voltage is zero at the output *s*1. In this state, the trigger circuit can change to the "1" state only when a positive pulse is applied to its input *e*1. The voltage of +3.5 volts is then available at the output *s*1. In order that the trigger circuit may return to the "0" state, its input *e*0 must receive a positive pulse. In the course of the description, it will be assumed that the logic "1" is represented by the said positive voltage and that the logic "0" is represented by a zero voltage, at least in regard to an output *s*1.

The connections established by the various logic circuits, as shown in FIGURE 1, are such that the device somewhat resembles a pulse counter. Thus, it may be seen that an AND circuit such as 17 establishes a connection between the output *s*1 of one trigger circuit and the input *e*1 of the succeeding trigger circuit. The same is the case with the connection of an output *s*0 to an input *e*0 of a succeeding trigger circuit, except in regard to the trigger circuits 12, 13 on the one hand and the trigger circuits 14, 15 on the other hand.

The majority of the AND circuits such as 17 have only two inputs and one output. The other AND circuits such as 18 have three inputs. However, each of the AND circuits has at least one input which receives certain of the rhythm pulses *a*1, *a*2, *a*3 in the manner indicated in FIGURE 1. These pulses, which are shown in the graph of FIGURE 2, may be supplied by one or more appropriate generators, which have not been illustrated because they may form part of any known art. It is sufficient to specify that the pulses *a*1, *a*2, *a*3 have in the present case an amplitude of 2 to 3 volts, a duration of about 60 nanoseconds and a repetition frequency of 2.5 mc./s. and that their relative shift is one-third of a bit period, the latter having a duration of 0.4 microsecond.

In addition, there is provided an AND circuit 19 whose inputs are connected respectively to the output *s*1 of the trigger circuit 12 and to the outputs *s*0 of the trigger circuits 14 and 15. The output of the AND circuit 19 is connected to the input of the amplifier 20. The latter, which is here symbolically represented by a circular sector, is a direct amplifier, i.e. a non-inverting amplifier. Such an amplifier is characterised by the fact that it supplies a positive pulse at its output when it receives a positive pulse at its input. As a result of the connections established, the output of the amplifier 20 supplies a train of pulses B7, the repetition period of which is equivalents to seven bit periods, i.e. 2.8 microseconds, which defines a "character cycle," in accordance with the fact that a character representation is composed of seven bits.

Another AND circuit 21 has four inputs connected respectively to the outputs *s*1 of the trigger circuits 13 and 14 and to the outputs *s*0 of the trigger circuits 12 and 16. The output of 21 acts on the input of the direct amplifier 22. The output of the latter supplies the pulse train B4, the repetition period of which is also equal to a character cycle. While a pulse B7 defines the seventh bit period *b*7, a pulse B4 defines the fourth bit period *b*4.

The pulses B71 and $\overline{B71}$ are available at the outputs *s*1 and *s*0 respectively of the trigger circuit 16, while the pulses B1–6 are available at the output *s*0 of the trigger circuit 13. The pulses B1–6 extend from the second third of the period *b*1 to the first third of the period *b*3 and from the second third of the period *b*5 to the first third of the period *b*7 inclusive.

The aforesaid clock-memory pulses are constantly emitted as soon as voltage is applied to the printing control arrangement.

FIGURES 3A and 3B, which are to be assembled along the lines XX, show the basic diagram of the printing control arrangement. A storage device capable of storing the characters of one printing line is represented in the form of a recirculation memory 30. The latter is composed essentially of a delay line 31, of any appropriate type. However, in a preferred construction, this delay line is of the torsional magnetostriction type, which has the advantage of having little sensitivity to temperature variations and which is of economical construction.

The element 32 symbolically represents a number of members, namely a logic circuit receiving the rhythm pulses *a*1, a writing amplifier and a transducer capable of imparting torsional-stress waves to the nickel wire of the delay line. The element 33 also symbolically represents members such as an output transducer and a reading amplifier supplying the pulses representing the character codes circulating along the delay line. The length of the latter is such that the time of transit between the two transducers corresponds to 162 previously defined character cycles.

The circulation loop comprises in addition a further element or access element 34. This is a shift register of known type, composed of seven stages, each stage comprising two bistable trigger circuits. The access element may therefore be regarded as consisting of two interconnected access half-elements RE and RM. The output of the half-element RE acts on the input of the element 32 and the loop is completed by the bifilar connection 35 between the output of the element 33 and the input of the half-element RM. The transit time of the access element 34 is equal to one character cycle, which brings the total circulation time of the loop to 163 character cycles, i.e. 456.4 microseconds.

There has only been shown incidentally a buffer register 36 capable of storing in parallel a character representation emanating from a series-parallel memory of an associated data processor. Seven switches such as 37 controlled by a character introduction device 38 are provided, by means of which the character representations corresponding to a printing line may be successively introduced into the half-element RE. For further details regarding the operations of introducing characters into the recirculation memory, reference should be made to the patent application filed on the same day as the present application by the applicants, for: System for the storage of coded character representations.

It will thus be assumed that before the beginning of any printing operation the recirculation memory 30 is completely filled with character representations which circulate at a rate controlled by the already-mentioned rhythm pulses *a*1, *a*2. The said character representations comprise 160 printing codes for a like number of characters which are to be printed, excepting the "space" codes, plus two index codes for two reference characters.

It will be seen on referring ot FIGURE 4 that the character codes are not stored in the recirculation memory in the intended order of the characters in the printed line. The numbers 1 to 16 appearing at the top of the columns of the table and the six lines marked "cycles 1–16 . . . cycles 145–163" show the interspersing of the characters in compact form. This interspersing arises from the fact that the memory of the data processor, operating in "shared time," can supply a character only once in a plurality of memory cycles. Moreover, the characters are supplied in their order of printing. Thus, assuming that the introducing operations are uninterrupted, the first character (marked 1 in the upper left-hand square compartment) would be introduced in the course of the 1st character cycle, the second character (2) in the course of the 9th cycle, the third in the course of the 17th cycle and so on. It will be observed that, since only 20 characters are introduced per lap of the loop, a little more than 8 loop laps will be required to fill the memory 30 completely if no interruption occurs.

If it is considered that the table of FIGURE 4 is valid from the space viewpoint, the storage position P1 in the bottom right-hand corner would correspond to the access element 34 of FIGURE 3A, and the point marked P163 in the top left-hand corner would correspond to the output of the element 33. It is as if the character codes zigzagged from right to left and from the bottom upwards in FIGURE 4.

The compartments marked 49′ and 160′ represent respectively the locations of a first index code KR1 and of a second index code KR2. These index codes occupy the positions illustrated, simply by reason of the interspersing of the character codes. The essential condition is that they divide the whole of the character codes into two parts. A blank compartment in the last line of the table corresponds to an empty position, which is necessary for effecting the shift of the data in the course of phases whose duration is normally of eight character cycles.

One very important point must be noted, namely that the interspersing of the character codes as illustrated is not essential. If the data processor has a different mode of transfer there would be nothing to prevent the characters from being located in the memory 30 in their normal printing order. Even in this case, the choice of the position of the index codes would admit of some latitude, the only requirement to be met being that indicated above.

It will be seen from FIGURE 4 that if, at a given instant referred to as the reference instant, the first character (1) is about to leave the position P163, the first reference character KR1 is situated in the 67th storage position, marked 49′, and the second reference character KR2 is situated in the 148th storage position, marked 160′.

As in most similar arrangements, there is provided a character comparator 39 (FIGURE 3A). This receives from the outputs of the half-element RM the character codes which pass through the latter. The comparator 39 also receives the code of the character type which may be printed, the character type changing at each printing phase. A type-code register 40 may receive this character type code coming from the type-code generator 41, when switches such as 42 are closed, these switches being controlled by a type-code introducing device 43. There is also provided a type-code erasing device 44.

A type-code generator equivalent to that mentioned in the foregoing has also been described in one or other of the aforesaid United States patent specifications.

The output of the comparator 39 is connected by means of the channel 45 and the logic circuits 46 and 47 to an input of each of the shift registers 48, 49, which are intended to store the comparison results in the course of each of the printing phases.

The shift registers 48 and 49 are composed of identical stages, the shift register 48 being composed of 80 stages and the shift register 49 of 81 stages. Each stage comprises an input intended to receive the shift pulses and an output such as 50 connected to one of the previously mentioned printing control members. It will be assumed for the moment that one of the outputs of the register 49 is not connected to a printing control member. The shift pulses may be delivered by two shift pulse generators 51 and 52, which are controlled by two memorisation devices 53 and 54 respectively. The latter are intended to memorise the successive detections of the reference characters KR1 and KR2. They also control through the channels 55 and 56 the logic circuits 46 and 47 respectively.

The outputs of the input half-element RM (FIGURE 3A) are also connected to two reference character detection devices 57 and 58. The latter control directly the memorising devices 53, 54. They also control various logic circuits symbolically represented by the memorisation-switching device 59 closely co-operating with the devices 53 and 54.

The intrinsic operation of the printing control arrangement, and specifically the recirculation cycle of the memory 30, not being in any way synchronised with the rotation of the type drum of the printer, a clock-drum pulse D2, previously mentioned, may be introduced at any instant of the said recirculation cycle. It follows that it cannot be known in advance which of the two reference characters KR1 and KR2 will be the first to pass through the half-element RM after arrival of a pulse D2 marking the imaginary beginning of a further printing phase. The co-operation of the devices 53, 54 and 59 is so established that the memorisation devices 53 and 54 can become operative only once in succession, i.e., one after the other, in the order in which the two reference characters KR1 and KR2 have been detected, and only after these detections.

An effective printing phase may be initiated under the control of a time-unifying device 60 (FIGURE 3A) co-operating with an end-of-printing control device 61.

The comparator 39 also has a control connection with a character erasing control device 62. The latter controls a character erasing device 63. Owing to these devices, immediately a printing character code has been found identical with the character type code supplied in a printing phase, this character code is erased at the level of the half-element RE, so that it no longer circulates through the memory 30.

By reason of the selecting functions performed by the logic circuits 46, 47 and by the devices 51, 52, 53, 54 when the comparator 39 supplies an equality-indicating signal, a binary "1" may be introduced into the extreme left-hand stage or input stage of one or other of the shift registers 48, 49, depending upon which of the memorisation devices 53 and 54 is operative at this instant. Therefore, at the end of a printing phase, but before the drive of the striking hammers, the two registers 48 and 49 contain together a "1" and "0" configuration which has been formed by repeated shifts. The organisation of the arrangement is such that if characters are to be printed, "1's" are situated in certain stages of the registers 48, 49, in the positions corresponding to those occupied by the character codes in the recirculation memory 30, at a previously defined reference instant. Of course, the "1's" in question are not in the right positions, since they are interspersed as were the characters in the memory 30. In order to restore the situation, it is sufficient to connect the output of each stage of the registers 48, 49 to the printing control member of appropriate rank, as will be explained in greater detail a little later.

The existing but non-essential functional connections have not all been illustrated in the basic diagram of FIGURES 3A and 3B, in order that the diagram may not be made too complex. They will be examined in the following description.

FIGURE 5 illustrates in a somewhat more detailed form the structure of the access element 34. This is composed essentially of 7 bistable trigger circuits 641 to 647 forming the access half-element RE and of 7 bistable trigger circuits 651 to 657 forming the half-element RM. In well-known manner, two AND circuits, such as 66 and 67, establish the connection between the outputs of one trigger circuit and the inputs of the succeeding trigger circuit. The AND circuits connected to the inputs of the trigger circuits 651–657 have an input which receives the rhythm pulses $a1$. The AND circuits connected to the inputs of the trigger circuits 641–647 have an input which receives the rhythm pulses $a2$. The mode of operation of this shift register is therefore "biphase." The input AND circuits 68, 69 have an input terminal to receive the outputs (all and $\overline{\text{all}}$) respectively of the delay-line reading amplifier. This means that it is the wires 35 (FIGURE 3A) which lead thereto. The outputs of the trigger circuit 647 are connected to the inputs (AEL and $\overline{\text{AEL}}$) of the delay-line writing amplifier.

The parallel access to any circulating character code is possible at the outputs of the trigger circuits 651–657 marked RM1-RM7 and $\overline{\text{RM1}}$–$\overline{\text{RM7}}$.

The character erasing devices 63 consists of the diodes 631 to 637, the anodes of which are connected to the inputs $e0$ of the trigger circuits 641–647. The signal Fz has the effect of bringing all the trigger circuits 641–647 to the "0" state, which constitutes the erasure of the character code which was in circulation. The other logic circuits and diodes illustrated must be disregarded, because these correspond substantially to the switches 37 in FIGURE 3A and therefore only have to perform a function at the initial introduction of the character codes.

FIGURE 6 shows in greater detail the logic structure of the shift registers 48 and 49. The register 48 comprises 80 stages RD1 to RD80 consisting essentially of high-speed bistable trigger circuit. The register 49 comprises 81 stages of like nature RD81 to RD161.

The outputs $s1$ of the trigger circuits denoted RD1 to RD161 are connected to the printing control members of the 160 printing positions in a particular order, because it is necessary to compensate for the aforesaid interspersing of the comparison results in the shift registers. Some illustrative indications will be sufficient to show what is concerned. Thus, the outputs RD1, RD2 RD3 about 0.7 volt in the forward conducting direction. The output RD50 controls the 114th position and the outputs RD79 and RD80 control the 90th and151st positions. Finally the outputs RD81, RD82, RD160 and RD161 control the 110th, 9th, 40th and 100th printing positions respectively. The output of the stage RD154 does not control any printing control member, because this stage corresponds to the empty position previously mentioned with reference to FIGURE 4.

FIGURE 7 illustrates the structure of any stage of the shift registers 48 and 49. It is essentially a question of a symmetrical bistable trigger circuit associated with two input control circuits. This trigger circuit comprises two transistors T and T′ of the NPN type, associated with diodes and resistors in known manner. It is to be noted that in each branch the two series-connected diodes D1 and D2 are silicon diodes capable of storing a given quantity of electricity and having a threshold voltage of about 0.7 volt in the forward conducting direction. The other diodes are germanium diodes for rapid switching.

The output terminals S1 and S0 are connected to the collectors of the transistors T′ and T respectively.

An input control circuit comprises a diode 70 in series with a resistor 71, as also a capacitor C. One plate of the capacitors C and C′ is connected to the shift rhythm input terminal ER. The junction point of the diode 70 and of the capacitor C is connected to the input E*g*. The control inputs C*g* and C*d* are connected respectively to the terminal S1′ and S0′, which may be the outputs either of the trigger of the preceding stage of the shift register or of another control device.

It will be assumed that in the stage RD under consideration the trigger circuit is in the "0" state, i.e. that T and T′ are non-conductive and conductive respectively. The voltage at S1 is substantially zero, and the voltage at S0 is about +3.5 volts. In the absence of a shift rhythm pulse, the terminal ER is at +3.5 volts. In dependence upon the control voltages previously received by the inputs C*g* and C*d*, only one of the capacitors C and C′ may be charged at the instant when a negative shift pulse is applied to the input ER. It is only in the case where the preceding stage RD′ is in the "1" stage that the shift pulse is transmitted to the input E*d*, and that it is then capable of changing the stage RD to the "1" state. Conversely, if the trigger circuit of the stage RD is initially in the "1" state, it is only in the case where the preceding stage RD′ is in the "0" state that it can change to the "0" state as a result of the shift pulse which it receives. Finally, it will readily be appreciated that if the stage RD′ was previously in the same state as the stage RD, the latter does not change its state when it receives a shift pulse.

By way of exception, the trigger circuit of the stage RD1 comprises an input EF1, called the "forcing-to-1" input, which is connected by a diode 73 to the junction point 72. Owing to this arrangement, the pulse of negative polarity at EF1 can change this trigger circuit to the "1" state.

The structure of the shift registers 48 and 49 is such that they operate in accordance with the "monophase" mode. It will be seen from FIGURE 6 that the inputs of the stages RD1 and RD81, which correspond for each of them to the inputs C*g* and C*d* of FIGURE 7, receive directly the control voltages *mc* and $\overline{mc}$ emanating from the comparator device 39. If the latter supplies an equality signal, a "1" may be introduced into the stage RD1 or into the stage RD81, depending upon whether the rhythm pulses which cause a shift of a stage are applied to the input terminal ER1 or to the input terminal ER2. On the other hand, if the comparator supplies an inequality signal, the shift pulses merely have the effect of advancing by one stage in each instance the "1's" already stored in one or other of the shift registers. Therefore, owing to the structure of the latter, which is very economical, the logic circuits 46 and 47 and the connections 55 and 56 (FIGURE 3B), may be omitted.

It will be seen from FIGURE 6 that the output $\overline{\text{RD161}}$ is connected to a register MP consisting of a bistable trigger circuit. It will be noted that this trigger circuit is brought to the "1" state at the end of the introduction of the characters and that it remains therein throughout the printing operation, thus indicating that the recirculation memory has in fact been entirely stocked with character codes.

FIGURE 8 supplies details regarding the devices 40 to 43. The type-code register 40 is composed of seven bistable trigger circuits, each having two inputs and two outputs. In the course of each of the successive printing phases, a different character type code is available at the outputs RCT1 and RCT7 and $\overline{\text{RCT1}}$ to $\overline{\text{RCT7}}$. The switches 42 in fact consist of 7 AND circuits 421 to 427. The type-code introduction device comprises an AND circuit 74 and a direct amplifier 75. Two inputs of the AND circuits 74 constantly receive the rhythm pulses *a*3 and the clock-memory pulses *b*4. The other input receives the signal *bc*2 from an output terminal BC2, which is visible in the diagram of the time-unifying device illustrated in FIGURE 11. When the signal *bc*2 is positive, a further character type code my be transmitted from the type-code generator 41 to the register 40.

The type-code erasing device 44 comprises seven AND circuits 441 to 447 and a direct amplifier 76. When the signal *bc*1 is positive, a rhythm pulse *a*2 applied in parallel to one of the inputs of the AND circuits 441–447 returns the register 40 to zero.

FIGURE 9 illustrates the index code detecting devices 57 and 58, which are of identical structure. For example, the device 57 comprises an AND circuit having 7 inputs and two amplifiers 781, 791, the whole being connected in cascade. The symbolic representation of 781 and 791 is that of an inverting amplifier, i.e. one which supplies a zero voltage at its output if its input receives a positive voltage, for example +3.5 volts, and vice versa. The indications marked beside the inputs of the AND circuits 771 and 772 show how the latter are connected to the outputs RM1 and RM7 and $\overline{\text{RM1}}$ to $\overline{\text{RM7}}$ visible in FIGURE 5. Since the 63 code combinations are employed for the printing characters, it has been necessary to choose two additional codes, with an even number of "ones" for reference characters KR1 and KR2, namely 0001111 for KR1 and 1111000 for KR2. For example, as long as the combination for KR1 is not detected, a positive voltage is available at the output marked $\overline{\text{KR1}}$ of the inverting amplifier 781. It is only when this combination is detected that a positive voltage appears at the output marked KR1 of the inverting amplifier 791.

FIGURE 10 illustrates the structure of the comparator 39 with its memory-register and of the character erasure control device 62. The comparator 39 consists of seven groups of logic circuits. Each group comprises two AND circuits 80, 81 having two inputs, one OR circuit 82 having two inputs and one inverting amplifier 83. The outputs of the seven amplifiers are connected in parallel to a common output terminal 84. Each group of logic circuits corresponds to one binary position. For example, the AND circuit 80 has one input connected to the output $\overline{\text{RM1}}$ (half-element RM, FIGURE 5) and the other input connected to the output RCT1 (register 40, FIGURE 8). The AND circuit 81 has one input connected to the output RM1 and the other input connected to the output $\overline{\text{RCT1}}$. It follows that, as long as there is an inequality between a printing character code and the character type code, the AND circuits of at least one group of logic circuits are conductive and apply a positive voltage to the input of the corresponding inverting amplifier, so that a zero voltage is set up at the output 84. On the other hand, when the equality of the compared codes is manifested, all the AND circuits must be rendered non-conductive so that a positive voltage appears at the output 84.

A comparison memory register comprises a trigger circuit 85 whose input *e*1 is connected to the output 84 by an AND circuit 86. The outputs of the trigger circuit 85 are marked MC (comparison memory) and $\overline{\text{MC}}$. An input of the AND circuit 86 symbolically represents one or two inputs receiving a clock-memory pulse and a rhythm pulse. In the present instance, it is a question of a pulse *b*7 and of a pulse *a*2, which means that the AND circuit 86 can be conductive only in the course of a 7th bit period *b*7 of a character cycle and at the beginning of the second third of this period (*a*2). For the sake of brevity, such an instant will hereinafter be defined by $b7 \cdot a2$. Another input receives the signal *bc*4 from the output BC4, which is shown in FIGURE 12. Thus, the trigger circuit 85 can change to the "1" state at the indicated instant, when the signal *bc*4 will be positive and an equality comparison will have been detected. Owing to the AND circuit 87, the trigger circuit 85 is systematically returned to the "0" state at a succeeding instant $b4 \cdot a3$.

The character erasure control device 62 comprises a number of AND circuits each associated with a direct amplifier. The outputs of the latter are connected to a common output terminal FZ. For example, the AND circuit 89 has one input receiving rhythm and clock-memory pulses at an instant $b7 \cdot a3$. Another input receives the above-mentioned signal $bc4$. Therefore, at such an instant, if the trigger circuit 85 is in the "1" state, a positive pulse, amplified by the direct amplifier 90, will be transmitted from the terminal FZ to the diodes 631–637 of FIGURE 5, which will result in the erasure of the character code passing through the input half-element RE. The function of the other AND circuits 88, 91 to 93 will be explained in the following.

The time-unifying device 60 will be examined with reference to FIGURE 11. This device is composed essentially of three trigger circuits 94, 95, 96 co-operating with a binary counter composed of three stages 97, 98 and 99. It is to be noted that each of the latter must have the same structure as each of the stages of the shift registers 48 and 49, as illustrated in FIGURE 7. The interconnections made, and the arrangement of the AND circuits 100 to 109, are such that the device 60 makes it possible for a printing phase to be initiated only after at least four character cycles succeeding the reception of the drum-clock pulses D2 and CS, which are applied to two inputs of the AND circuit 100. This delay of four character cycles is necessitated by operating contingencies of the striking members.

It is to be noted that the AND circuits 103 and 107 receive clock-memory pulses and rhythm pulses, so that they can be conductive only at instants $b4 \cdot a2$ and $b1 \cdot a1$ respectively, while the AND circuit 104 may be conductive in any bit period, except the period $b1$, at an instant $a1$. In addition, the AND circuits 100 and 101 may receive respectively the control signals from the terminal $\overline{\text{FIN}}$ and FIN shown in FIGURE 13. The AND circuit 103 may receive a control signal from the terminal $\overline{\text{PZ}}$, which is also shown in FIGURE 13. With regard to the AND circuits 108 and 109, they may receive a control signal from the terminals VC1 and VC2 respectively, which are shown in FIGURE 12.

In this FIGURE 12, the combination of the circuits as shown is equivalent to the devices 53, 54 and 59 of FIGURE 3B. Notably, the trigger circuit 111 has the function of memorising the detection of the index code KR1 and the trigger circuit 112 has the function of memorising the detection of the index code KR2. Each of the AND circuits 113 to 120 has an input connected to one of the terminals KR1 and KR2 of the reference character detectors illustrated in FIGURE 9. In addition, the AND circuits 114, 117 and 119 have an input connected to the output BC3 and the circuit 120 has an input connected to the terminl $\overline{\text{BC3}}$, which is shown in FIGURE 11. The trigger 110 with its associated logic circuits constitutes an auxiliary register, due to which the trigger circuit 111 and the trigger circuit 112 may assume the "1" state in this order or in the inverse order, depending upon whether it is an index code KR1 or KR2 which has first been detected after a drum-clock pulse D2. The inverting amplifier 122 is connected to the output of the AND circuit 121, the inputs of which are connected to the output $s0$ of the trigger circuits 111 and 112 respectively. It follows that a positive voltage is available at the output BC4 as long as either one of the trigger circuits 111 and 112 is in the "1" state.

The end-of-printing control device 61 illustrated in FIGURE 13 comprises the trigger circuits 123 to 126 and the associated logic circuits 127 to 137. The trigger circuit 123 has the function of detecting the fact that an operation of printing a line of characters is virtually complete, while the trigger circuit 124, after having memorised this detection, may control, through the registers 125 and 126, the performance of a number of secondary functions concluding the printing operation, as will hereinafter be explained.

The shift pulse generators 51 and 52 are illustrated in FIGURE 14. They are of identical structure and, for example, the generator 51 comprises the AND circuit 511, the direct amplifier 512 and a plurality of inverting amplifiers such as 513. The outputs R1 are connected to the 80 shift inputs ER1 of the shift register 48 (FIGURE 6). The outputs R2 are connected to the 81 shift inputs ER2 of the shift register 49. The number of amplifiers 513 or 523 is an inverse function of the gain of each amplifier. The latter will supply negative shift pulses each time the AND circuit 511 or the AND circuit 521 is conductive, that is to say, at instants $b4 \cdot a2$. The device 51 supplies these pulses when the voltage supplied by the terminal VC1 (FIGURE 12) is positive, i.e. between the detection of a reference character KR1 and the succeeding detection of a reference character KR2. Likewise, the device 52 supplies these pulses between the detection of the reference character KR2 and the succeeding detection of the character KR1.

It is to be noted that devices (not shown) may be operative either immediately voltage is applied or during the introduction of the characters in order to bring certain trigger circuits into predetermined states. Thus, where one input is shown below the rectangle of a trigger circuit, this means that this trigger circuit is previously returned to the "0" state, which is the general case. On the other hand, when an input is shown above the rectangle of a trigger circuit, this means that this trigger circuit is previously brought into the "1" state. This is the case only with the trigger circuits 97 to 99 of the counter of FIGURE 11.

There will now be considered with reference to FIGURE 15 the operation of the printing control arrangement. As already stated, a first printing phase may be initiated after the coincidence of a signal CS and of a "drum-clock" pulse D2, as illustrated on the upper line of the time graph. Since the trigger circuit 124 (FIGURE 13) is at "0," the signal $\overline{\text{FIN}}$ is positive. Therefore, at a succeeding instant $a1$, the AND circuit 100 (FIGURE 11) brings the trigger circuit 94 to "1" and the output BC1 becomes positive. At the succeeding instant $a2$, the device 44 (FIGURE 8) is actuated and any content of the type code register 40 is erased (see line RCT in the graph). The graph as drawn assumes that the pulse D2 has been received at the end of a bit period $b5$. If the pulse D2 arrives earlier, the above events will occur earlier in the course of the character cycle X0. In any case, nothing happens until the instant $b4.a2$ of the succeeding cycle X1. At this instant, since the output $\overline{\text{PZ}}$ of the trigger circuit 123 (FIGURE 13) is positive, the AND circuit 103 (FIGURE 11) brings the trigger circuit 95 to "1" and the output BC2 becomes positive. At the succeeding instant $b4.a3$, the devices 42 and 43 are actuated to effect the introduction of the first character type code into the register 40. This is also followed, at the succeeding instant $b5.a1$, by the return of the trigger circuit 94 to "0," which is produced by the AND circuit 102.

The action of the counter of FIGURE 11 commences at the end of this cycle X1, in the period $b7$. At the instant $b7.a3$, the AND circuit 106 brings the trigger circuit 97 to "0." The output $s1$ of the latter supplies a negative pulse, which brings the trigger circuit 98 to "0." At the instant $b1.a1$ of the cycle X2, the AND circuit 105 returns the trigger circuit 97 to "1." At the instant $b7.a3$ of this cycle, the AND circuit 106 returns the trigger circuit 97 to "0." The output $s1$ of the latter supplies a negative pulse which returns the trigger circuit 98 to "1." The output $s0$ of the latter supplies a negative pulse which brings the trigger circuit 99 to "0." The time graph clearly shows the states through the trigger circuits 97, 98, 99 pass in the course of the succeeding cycles X3 and X4. It will be seen that at the instant $b1.a1$ of the cycle X5, the three trigger circuits have together returned to the "1" state, thus signifying that four character cycles (X1 to X4) have been counted. At the succeeding instant $b1.a2$, the AND circuit 107 is conductive and brings the trigger circuit 96 to "1." The output BC3 becomes positive. It follows that at the succeeding instant $b1.a3$ the AND circuit 104 restores the trigger circuit 95 to "0."

At the succeeding instant $b4.a3$, the AND circuit 129 (FIGURE 13) brings to "1" the trigger circuit 123, whose outputs $s1$ and $s0$ ($\overline{PZ}$) become positive and negative respectively. The output $\overline{PZ}$ is an inhibiting voltage because, when applied to an input of the AND circuit 103 (FIGURE 11), it prevents the trigger circuit 95 from changing to the "1" state. Nothing further occurs until the end of the cycle X5 and even during a variable number of character cycles symbolised by the period XA in FIGURE 14, prior to the first detection of an index code by one or other of the devices 57 and 58 of FIGURE 9. This detection will mark the beginning of an extraction phase.

It will be assumed to begin with that it is the reference character KR1 which first passes through the access half-element RM. The output KR1, FIGURE 9, supplies a positive pulse in the period $b7$ of a cycle XA. It follows that, at the succeeding instant $b7 \cdot a3$, the AND circuits 114 and 119 (FIGURE 12) are conductive and bring the trigger circuits 111 and 110 to "1." Since the output VC1 becomes positive, the AND circuit 108 produces the return of the trigger circuit 96 to "0" at the instant $b1 \cdot a1$ of the succeeding cycle XE. The trigger circuit 111, which memorises the detection of the reference character KR1, will remain in the "1" state during at least 81 character cycles, i.e. until the detection of the reference character KR2. When the latter occurs, the AND circuit 116 changes the trigger circuit 112 to "1" at an instant $b7 \cdot a2$. A further consequence is that the AND circuit 115 restores the trigger circuit 111 to "0" at the succeeding instant $b7 \cdot a3$. The trigger circuit 112 memorises the detection of the reference character KR2 during at least 81 cycles, i.e. until a further detection of the reference character KR1. When this occurs, it is found that the AND circuit 118 is conductive at the instant $b7 \cdot a3$ for restoring the trigger circuit 111 to "0." At the same instant, the AND circuit 120 restores the trigger circuit 110 to "0."

Assuming first of all that it is the reference character KR2 which first occurs, then the AND circuit 117 changes the trigger circuit 112 to "1" at the instant $b7 \cdot a3$. Later, at the detection of KR1, the AND circuit 113 changes the trigger circuit 111 to "1" at the instant $b7 \cdot a2$ representing the end of the cycle. At the succeeding instant $b7 \cdot a3$, the AND circuit restores the trigger circuit 112 to "0." Later still, on further detection of KR2, the AND circuit 115 restores the trigger circuit 111 to "0." It will here be noted that the trigger circuit 110 has constantly remained in the "0" state. It will be recalled that the output voltage BC4 remain positive in the interval of time between the first and second detections of the same reference character, i.e. during the period of an extraction phase. FIGURE 16 shows how the extraction phases occur among the printing phases bounded by the successive pulses D2. In this figure, the proportions of the duration of a printing phase and of the duration of an extraction phase have been disregarded in order to show, over a reduced interval of time, the shifts which occur in the detection of the reference characters KR1, KR2, in relation to the pulses D2. In addition, the duration of an extraction phase is exactly the same as the recirculation time of the recirculation memory 30.

Reference will now again be made to the first cycle XE of FIGURE 15 and it will be assumed that the first extraction phase has commenced by the detection of the reference character KR2 and that none of the character codes stored in the memory 30 is identical to the character type codes stored in the registor 40. It will be seen that at the instant $b7 \cdot a2$, since the voltage $vc2$ is positive, the AND circuit 521 of the device 52 (FIGURE 14) transmits a positive pulse to the direct amplifier 522, so that the inverting amplifiers 523 supply a shift rhythm pulse at the inputs ER2 of the shift register 49. This pulse has no great effect, since in principle all the stages of the registers 48 and 49 are in the "0" state.

It is clear that at the succeeding instant $b7 \cdot a2$ the AND circuit 86 (FIGURE 10) remains non-conductive, despite the positive voltage $bc4$, since the output 84 of the comparator supplies an inequality signal, or zero voltage. The trigger circuit 85 remains at "0" and the AND circuit 89 remains non-conductive, so that character erasure is prevented.

There is provided an empty-position detector which controls the input $s0$ of the trigger circuit 123 of FIGURE 13. An input of the AND circuit 130 receives the output of the inverting amplifier 128, which itself is connected to the output of the AND circuit 127. When the memory 30 contains circulating character codes, at least one bit of the latter is a "1." At least one of the inputs of the AND circuit 127 receives a zero voltage, which renders it non-conductive, so that the output of the inverting amplifier 128 is positive. At the succeeding instant $b7 \cdot a3$, all the inputs of the AND circuit 130 receive a positive voltage and this AND circuit therefore returns the trigger circuit 123 to "0," and the said trigger circuit resumes its normal function, which is to indicate by its "0" state the presence of character codes in the memory 30.

In each of the succeeding cycles, a shift pulse is applied to the register 49, and this is followed by a comparison which again gives an inequality result, during the first half of the extraction phase which is in progress. After the detection of the reference character KR1, i.e. after the second half of the extraction phase, the operations are similar, except that it is now the device 51 which supplies the shift pulses to the shift register 48.

It will now be considered in what respect the operation differs, for example in the course of the first half of an extraction phase as above, but in the case where a character code is identical to the character type code belonging to the printing phase in progress. It is clear that at the end of the character cycle the output 84 of the comparator 39 (FIGURE 10) is positive and at the instant $b7 \cdot a2$ the AND circuit 86 brings the trigger circuit 85 to "1" (see line MC, FIGURE 15).

At the succeeding instant $b7 \cdot a3$, since the AND circuit 89 is conductive, the output terminal FZ sends a pulse to the inputs of the half-element RE (FIGURE 5), to which inputs the diodes 631–637 are connected, so that the character code which has just been compared is erased. In the course of the succeeding cycle, such as XE' (FIGURE 15), when the shift pulse is applied to the inputs ER2 of the shift register 49, at the instant $b4 \cdot a2$, the inputs of the stage RD81 receive a positive voltage and a negative voltage ($mc$ and $\overline{mc}$) respectively. As has previously been explained, this results in the introduction of a "1" into this stage. At the succeeding instant $b4 \cdot a3$, the AND circuit 87 returns the trigger circuit 85 to "0." In the course of the other cycles, each time a comparison supplies an equality result, the same events occur, and at the end of an extraction phase, after repeated shifts, those stages of the registers 48 and 49 which contain a "1" are capable of controlling the operation of the members controlling the printing of the appropriate printing positions.

There will now be considered the case where a printing character code passing through the half-element RM is the previously mentioned "space" code. Reference will now be made to FIGURE 10, which shows a device 23 (not hitherto described) for the "space" code detection. This device comprises two AND circuits 24 and 26, and two direct amplifiers 25 and 27. It is necessary for preventing the introduction of the "1's" into the shift registers during the printing phase during which the type-code register supplies the "space" code 0000001 and in which the comparator can detect the "space" codes circulating in the memory 30. At each of these detections, the trigger circuit 85 changes to "1," at an instant $b7.a2$ of a character cycle. The six inputs of the AND circuit 24 being connected to the outputs $\overline{RM1}$ to $\overline{RM6}$ of the half-element RM, and an input of the AND circuit 26 being connected to the output RM7, this device also detects each "space" code. Another input of the AND circuit 26 receives the signal (for example manual control) which is always positive during a printing operation. On the other hand, the signal *bc*4 authorises this AND circuit during any extraction phase. Therefore, the output ZB is positive during a period *b*7. Consequently, at the succeeding instant *b*7.*a*3 the AND circuit 88 applies a pulse to the input *s*0 of the trigger circuit 85, which is returned to "0" earlier than in the other printing phases. In this way, no "1" can be introduced into either of the registers 48 and 49. At this instant, the AND circuit 93 allows a positive pulse to pass towards the output FZ, which results in the erasure of the "space" code in the half-element RE.

It will be readily appreciated that when all the characters constituting a printing line have been printed, only the two reference characters KR1 and KR2 remain in circulation in the memory 30, because during the transit of the index codes in the half-element RM, the comparator always supplies an inequality result and it is obvious that the reference characters are never erased during the effective printing phases.

The terminal operations taking place just after the last effective printing phase will be considered. A further pulse D2 re-triggers the time-unifying device 60 of FIGURE 11. The events described with reference to FIGURE 15 again occur within the extent of the cycles X1 to XA, i.e. until the first detection of a reference character. It will be assumed that the latter is KR1 at the end of the cycle XA. Thereafter, since there is no further printing character code in the memory 30, all the inputs of the AND circuit 12, (FIGURE 13) receive a positive pulse. Therefore, the output voltage of the inverting amplifier 128 is zero. It follows that at the instant *b*7.*a*3 of the cycle XE the AND circuit 130 is non-conductive and the register 123 is not returned to "0," thus indicating the virtual emptying (except for KR1 and KR2) of the memory 30 and the virtual end of the printing operation. The same will be the case in the course of the succeeding cycles XE. More particularly at detection of KR1, the AND circuit 130 will remain non-conductive, since the voltage supplied by the outputs $\overline{KR2}$ or $\overline{KR1}$ of the detectors 58 and 57 will be zero.

It is necessary to await a further pulse D2, which again triggers the time-unifying device 60 (FIGURE 11). The cycle X1 (FIGURE 15) in which the trigger circuit 94 has changed to "1" and the output BC1 is positive, will be considered. At the succeeding instant *b*4.*a*3, the AND circuit 131 (FIGURE 13) is conductive, since the trigger circuit 123 is at "1." The trigger circuit 124 therefore changes to "1" in order to control the terminal operations. On the other thand, the AND circuit 103 (FIGURE 11) is rendered non-conductive a little earlier owing to the fact that the voltage $\overline{pz}$ is zero. Consequently, the change of the trigger circuits 95 and 96 to "1" is prevented. At the succeeding instant *b*5.*a*1, the AND circuit 102 cannot return the trigger circuit 94 to "0." It is the AND circuit 101 which undertakes this, since it has an input connected to the output FIN of the trigger circuit 124. Thus, the action of the time-unifying device stops here.

It will be observed that since the trigger circuit 96 has remained at "0," the output BC3 supplies a zero voltage. Therefore, at the instant of the detection of KR1 or KR2 the AND circuits 114, 117 and 119 (FIGURE 12) are non-conductive, thus preventing the devices for the memorisation of the reference characters 53 and 54 from being rendered operative.

In the character erasure control device 62 (FIGURE 10) there are provided two AND circuits which have not hitherto been mentioned. These are 91 and 92, each of which has an input which receives the voltage, now positive, of the output FIN of the trigger circuit 124. Therefore, at the detection of the reference character KR1 (or KR2), a positive pulse is transmitted to the output FZ at an instant *b*7.*a*3. This obviously results in the erasure of KR1 (or KR2) in the half-element RE.

It will also be seen that one input of each of the AND circuits 134 and 136 (FIGURE 13) receives this positive pulse emanating from the output FZ. Therefore, at the detection of KR1, the register 125 changes to "1." The same is the case with the register 126 at the detection of KR2.

There is provided an AND circuit 28 (FIGURE 6) which has two inputs connected to the outputs KU and KD of the trigger circuits 125 and 126. When these two trigger circuits have been brought to "1," this AND circuit returns the register MP to "0," which indicates that the memory 30 is now completely empty.

Another AND circuit 29 (FIGURE 6) is connected to the "forcing-to-1" input of the stage DR1 of the shift register 48. It also has two inputs connected to the outputs KU and KD, and under the same conditions as above, brings about the introduction of a "1" into the said stage. These latter two operations are not essential, but they are useful when certain devices of the control arrangement are employed during an operation of introducing character codes into the recirculation memory. The change in the register MP to the state "0" also has the effect of causing the trigger circuits 125 and 126 to be returned to "zero" by means of the AND circuits 135 and 137 at an instant of a period *b*1, *b*2, *b*5 or *b*6.

It has been seen that the index codes KR1 and KR2 perform an essential function in the control of the performance and linkage of the operational phases of the many devices of the printing control arrangement. It is owing to the fact that there are two reference characters that the comparison of the characters can commence at each printing phase by either one-half of the characters circulating in the "series" memory, or the other half.

This organisation is particularly advantageous from the viewpoint of time-saving, because when the character types are relatively few or are favourably distributed, the time necessary for completely printing a line of characters may be very much shorter than the duration of one revolution of the type drum.

The construction details which have been described merely constitute a non-limiting example, because it is obvious that structural modifications to certain devices are within the ability of the person skilled in the art.

We claim:

1. In an electronic high speed printer of the rotating type-drum class having a series of 2N hammer actuators, first generator means supplying in succession different type codes, and second generator means supplying a drum position pulse at each printing cycle, a print control arrangement comprising in combination:

a first recirculating memory (30) of the "series" type containing two differing index-codes spaced apart from each other by at least N character positions, this memory including a circulating access element (34), a comparator (39) adapted to compare the character representations to be printed circulating through said access element with a type-code supplied by said first generator means for providing a signal as a result of a match in such comparison, a second memory in the form of two shift registers (48, 49), each having N stages, with outputs for controlling each an associated one of said hammer actuators and with inputs for receiving signals indicative of comparison results from said comparator, two detectors (57, 58) adapted each to detect from said access element one of said index-codes registering means including two registers (53, 54)

adapted each to memorize the detection of an index-code by an associated one of said detectors, and control circuits coordinated to said second generator means, which are made operative under control of said registering means to authorize inputs of each of said shift registers, whereby the entry of comparison results may begin in one or the other of said shift registers according to which index-code has been first detected after a drum position pulse.

2. A print control arrangement as claimed in claim 1, wherein switching means (62, 63), under control of said comparator (39) are connected to inputs of said access element (34) for cancelling out of said first memory any character representation which has been found to be identical to the said type-code.

3. A print control arrangement as claimed in claim 2, in which character cycles related to the circulation time of said first memory are defined by internal clock pulse generators, the arrangement being characterised by a time unifying arrangement (60) including several bistable circuits (94, 96) associated with counting means (97–99) and interconnected by logical circuits one of which receives each of said drum position pulses (D2), one of said bistable circuits being connected in a manner such as to make operative one or the other of said registers (53, 54) after counting a predetermined number of character cycles following the receipt of such a drum position pulse.

4. A print control arrangement as claimed in claim 3, wherein said registering means, besides a first bistable circuit (111) and a second bistable circuit (112), includes a third bistable circuit (110) and input and interconnecting logical circuits, some of them being connected to said detectors, so that one of said first and second bistable circuits supplies a control signal in the time interval between the detections of a first index-code and a second index-code, whether occurring in this order or in the converse order.

5. A print control arrangement as claimed in claim 3, wherein said access element (34) is constituted by a shift register having as many stages as there are bits in a print character code, each stage comprising two coupled bistable circuits, said stages receiving clock pulses so that the circulation time in said shift register is equal to one character cycle time.

6. A print control arrangment as claimed in claim 4, comprising two generator means (51, 52) under control of said first bistable circuit (111) and of said second bistable circuit (112) respectively, for separately generating a shift pulse train, and connecting means for applying separately such a shift pulse train upon shift inputs of one or the other of said shift registers (48, 49) after detection of said first and second index-codes respectively.

7. A print control arrangement as claimed in claim 6, wherein each of said shift registers (48, 49), which operates according to the "monophase" mode of operation, has a first stage whose inputs are controlled by an output of said comparator (39), so that when the latter supplies an equal comparison condition, a binary one is entered only in the first stage of the shift register which is receiving said shift pulse train on its shift inputs.

8. A print control arrangment as claimed in claim 7, comprising a character erasing device (62), a group of switching circuits (63) connected to authorize or not inputs of some of the bistable circuits of said access element (34) and receiving signals from said erasing device, and a "space" code detector (23) connected to output of said access element (34) and adapted to control on the one hand a register (85) included in said comparator (39), and on the other hand, the operation of said erasing device, so that, upon detection of such a "space" code, it prevents the entry of a binary one into the first stage of one of said shift registers, and it causes the erasing of said "space" code in said access element.

9. In a high speed printer of the rotating type-drum class having a series of 2N hammer actuators, first generator means for supplying different type-codes, and second generator means for supplying a drum position pulse at the outset of each printing cycle, a print control arrangement comprising in combination:

a first recirculating memory (30) in the form of a delay line closed loop dynamically storing a first index-code (KR1) and a second index-code (KR2) spaced apart in time by a time corresponding at least to N character representations, this memory loop including an access element (34) from which the code bits may be parallelly accessed, a comparator (39) connected to compare the character representations to be printed circulating through said access element with a type-code supplied by said first generator means (40, 41) for emitting a control signal as a result of a match in such a comparison, a second memory in the form of a first shift register (48) and a second shift register (49), each having N stages, with outputs for controlling each an associated one of said hammer actuators, each shift register having a first stage, two detectors (57, 58) connected and logically adapted to detect from said access element, said first and second index-codes respectively, registering means including two registers (53, 54) adapted each to memorize the detection of an index-code by an associated one of said detectors, control circuits (60) coordinated to said second generator means and arranged to set into activity only one of said registers in any order and, switching circuits (46, 47) under control of said comparator (39) and of said registering means, and connected to authorize or not the first input stages in said shift registers (48, 49) so that the entry of comparison results may begin in said first shift register or in said second shift register according to whether said first index-code or said second index-code has been first detected after occurrence of a drum position pulse.

10. A print control arrangement as claimed in claim 9, wherein the circulation time of said first recirculating memory 30 is at least equal to half the duration of one printing cycle, which is defined by the time interval separating two consecutive ones of said drum position pulses.

11. A print control arrangement as claimed in claim 10, wherein switching means (62, 63), under control of said comparator (39) are connected to inputs of said access element (34) for cancelling out of said first memory any character representations which has been found to be identical to the said type-code.

12. A print control arrangement as claimed in claim 11, in which character cycles related to the circulation time of said first memory are defined by internal clock pulses generators, the arrangement being characterized by a time-unifying arrangement (60) including several bistable circuits 94–96) associated with counting means (97–99) and interconnected by logical circuits one of which receives each of said drum position pulses (D2), one of said bistable circuits being connected in a manner such as to make operative one or the other of said registers (53, 54) after counting a predetermined number of character cycles following the receipt of such a drum position pulse.

13. A print control arrangement as claimed in claim 12, wherein said registering means, besides a first bistable circuit (111) and a second bistable circuit (112) includes a third bistable circuit (110), and input and interconnecting logical circuits, some of them being connected to said detectors, so that one of said first and second bistable circuits supplies a control signal in the time interval between the detections of a first index-code and a second index-code, whether occurring in this order or in the converse order.

14. A print control arrangement as claimed in claim 12, wherein said access element (34) is constituted by a shift register having as many stages as there are bits in a print character code, each stage comprising two coupled bistable circuits, said stages receiving clock pulses so that the circulation time in said shift register is equal to one character cycle time.

15. A print control arrangement as claimed in claim 13, comprising two generator means (51, 52) under control of said first bistable circuit (111) and of second bistable circuit (112) respectively, for separately generating a shift pulse train, and connecting means for applying separately such a shift pulse train upon shift inputs of one or the other of said shift registers (48, 49) after detection of said first and second index-codes respectively.

References Cited

UNITED STATES PATENTS

| | | | |
|---|---|---|---|
| 2,915,966 | 12/1959 | Jacoby | 101—93 |
| 2,915,967 | 12/1959 | Gehring et al. | 101—93 |
| 3,107,344 | 10/1963 | Baker et al. | 340—173 |
| 3,308,440 | 3/1967 | Truitt et al. | 340—172.5 |
| 3,351,917 | 11/1967 | Shimabukuro | 340—172.5 |
| 3,377,622 | 4/1968 | Burch et al. | 340—172.5 |

PAUL J. HENON, *Primary Examiner.*

J. P. VANDENBURG, *Assistant Examiner.*

U.S. Cl. X.R.

101—93